(12) United States Patent
Russell et al.

(10) Patent No.: US 8,998,064 B2
(45) Date of Patent: Apr. 7, 2015

(54) FRICTION STIR METHOD AND A PAIR OF WORKPIECES JOINED BY SUCH METHOD

(75) Inventors: Michael Jonathan Russell, Great Abington (GB); Nathan Leonard Horrex, Great Abington (GB); Adrian Charles Addison, Granta Park (GB)

(73) Assignee: The Welding Institute, Cambridge (GB)

( * ) Notice: Subject to any disclaimer, the term of this patent is extended or adjusted under 35 U.S.C. 154(b) by 0 days.

(21) Appl. No.: 12/301,000

(22) PCT Filed: May 15, 2007

(86) PCT No.: PCT/GB2007/001832
§ 371 (c)(1),
(2), (4) Date: Nov. 14, 2008

(87) PCT Pub. No.: WO2007/132252
PCT Pub. Date: Nov. 22, 2007

(65) Prior Publication Data
US 2009/0123778 A1    May 14, 2009

(30) Foreign Application Priority Data

May 15, 2006    (GB) .................................. 0609669.7

(51) Int. Cl.
*B23K 20/12*    (2006.01)
*B23K 20/227*    (2006.01)
(52) U.S. Cl.
CPC ..... *B23K 20/1275* (2013.01); *Y10T 428/12812* (2015.01); *B23K 20/1225* (2013.01); *B23K 20/122* (2013.01); *B23K 20/1235* (2013.01); *B23K 20/124* (2013.01); *B23K 20/125* (2013.01); *B23K 20/227* (2013.01); *B23K 2203/04* (2013.01); *B23K 2203/14* (2013.01); *B23K 2203/18* (2013.01)

(58) Field of Classification Search
None
See application file for complete search history.

(56) References Cited

U.S. PATENT DOCUMENTS

| | | | | |
|---|---|---|---|---|
| 5,460,317 A * | 10/1995 | Thomas et al. | ............ | 228/112.1 |
| 5,697,544 A * | 12/1997 | Wykes | ............ | 228/2.1 |
| 5,713,507 A | 2/1998 | Holt et al. | | |
| 5,718,366 A * | 2/1998 | Colligan | ............ | 228/112.1 |
| 5,893,507 A * | 4/1999 | Ding et al. | ............ | 228/2.1 |
| 6,206,268 B1 * | 3/2001 | Mahoney | ............ | 228/112.1 |
| 6,364,197 B1 * | 4/2002 | Oelgoetz et al. | ............ | 228/112.1 |
| 6,660,106 B1 * | 12/2003 | Babel et al. | ............ | 148/527 |
| 6,811,632 B2 * | 11/2004 | Nelson et al. | ............ | 156/73.5 |
| 7,201,811 B2 * | 4/2007 | Babel et al. | ............ | 148/535 |

(Continued)

FOREIGN PATENT DOCUMENTS

| | | |
|---|---|---|
| DE | 198 30 550 | 1/2000 |
| EP | 1 738 856 | 1/2007 |

(Continued)

OTHER PUBLICATIONS

Machine translation of JP-2004-358513A (no date available).*

(Continued)

*Primary Examiner* — Kiley Stoner

(57) ABSTRACT

A friction stir method comprises causing a rotating probe (1) of a friction stir tool to enter a workpiece or a joint between a pair of workpieces (89), the or each workpiece being a low conductivity, high melting point metal or metal alloy. The probe (1) extends from a shoulder (4), or between shoulders, in contact with the workpiece(s) and rotates relative to the or each shoulder.

13 Claims, 4 Drawing Sheets

(56) References Cited

U.S. PATENT DOCUMENTS

| | | | |
|---|---|---|---|
| 7,270,257 B2 * | 9/2007 | Steel et al. | 228/2.1 |
| 7,568,608 B1 * | 8/2009 | Ding | 228/110.1 |
| 7,581,665 B2 * | 9/2009 | Burton et al. | 228/2.1 |
| 7,641,096 B2 * | 1/2010 | Burton et al. | 228/2.1 |
| 7,654,435 B2 * | 2/2010 | Kumagai et al. | 228/112.1 |
| 7,681,773 B2 * | 3/2010 | Burton et al. | 228/2.1 |
| 2002/0014516 A1 * | 2/2002 | Nelson et al. | 228/112.1 |
| 2002/0046864 A1 * | 4/2002 | Bellino et al. | 174/70 B |
| 2003/0111515 A1 | 6/2003 | Scheglmann et al. | |
| 2003/0201307 A1 | 10/2003 | Waldron et al. | |
| 2003/0205565 A1 * | 11/2003 | Nelson et al. | 219/148 |
| 2003/0217994 A1 | 11/2003 | Ding | |
| 2004/0050906 A1 * | 3/2004 | Rice et al. | 228/112.1 |
| 2004/0074944 A1 * | 4/2004 | Okamoto et al. | 228/2.1 |
| 2004/0079454 A1 * | 4/2004 | Babel et al. | 148/527 |
| 2004/0118899 A1 * | 6/2004 | Aota et al. | 228/112.1 |
| 2004/0149807 A1 * | 8/2004 | Schilling et al. | 228/112.1 |
| 2004/0238599 A1 * | 12/2004 | Subramanian et al. | 228/112.1 |
| 2005/0045694 A1 * | 3/2005 | Subramanian et al. | 228/112.1 |
| 2005/0156010 A1 * | 7/2005 | Flak et al. | 228/112.1 |
| 2006/0006211 A1 * | 1/2006 | Loitz et al. | 228/112.1 |
| 2006/0081683 A1 * | 4/2006 | Packer et al. | 228/112.1 |
| 2006/0163328 A1 * | 7/2006 | Subramanian et al. | 228/112.1 |
| 2006/0208034 A1 * | 9/2006 | Packer et al. | 228/112.1 |
| 2006/0255098 A1 * | 11/2006 | Runyan | 228/112.1 |
| 2006/0283918 A1 * | 12/2006 | London et al. | 228/112.1 |
| 2006/0289604 A1 * | 12/2006 | Zettler et al. | 228/2.1 |
| 2007/0017960 A1 * | 1/2007 | Talwar | 228/112.1 |
| 2007/0102492 A1 * | 5/2007 | Nelson et al. | 228/112.1 |
| 2007/0152015 A1 * | 7/2007 | Burton et al. | 228/2.1 |
| 2007/0228104 A1 * | 10/2007 | Mankus et al. | 228/101 |
| 2008/0296350 A1 * | 12/2008 | Henneboehle et al. | 228/112.1 |
| 2009/0090700 A1 * | 4/2009 | Sato et al. | 219/117.1 |
| 2009/0120995 A1 * | 5/2009 | Hallinan et al. | 228/2.3 |
| 2009/0236045 A1 * | 9/2009 | Burton et al. | 156/349 |

FOREIGN PATENT DOCUMENTS

| | | |
|---|---|---|
| GB | WO 93/10935 A1 * | 6/1993 |
| JP | 10-52770 | 2/1998 |
| JP | 11-197856 | 7/1999 |
| JP | 2001252774 | 9/2000 |
| JP | 2004358513 | 9/2000 |
| JP | 2001-252774 | 9/2001 |
| JP | 2003-532542 | 11/2003 |
| JP | 2003326372 | 11/2003 |
| JP | 2004-504158 | 2/2004 |
| JP | 2004-082144 | 3/2004 |
| JP | 2004090050 | 3/2004 |
| JP | 2004-337860 | 12/2004 |
| JP | 2004-358513 | 12/2004 |
| JP | 2004-358556 | 12/2004 |
| JP | 2005205496 | 12/2004 |
| JP | 2005-519769 | 7/2005 |
| KR | 2001-252774 | 9/2001 |
| WO | WO 03/064100 | 8/2003 |
| WO | WO 2004/091839 | 10/2004 |

OTHER PUBLICATIONS

"Navy Experts Explain the Newest Material & Structural Technologies", AMPTIAC Quarterly, vol. 7, Nov. 3, 2003, 72 pages.

Office Action for Japanese Application No. JP 2009-510545; 4 pages.

"Recent Trend of Friction Stir Welding"; Ferum, vol. 7 (2002), No. 10; pp. 773-776.

"Friction Stir Welding of Carbon Steel"; Welding Institute National-Wide meeting paper; No. 77 (Sep. 2005); pp. 168-169.

Chemical engineering manual, published by Maruzen; May 10, 1968; pp. 1317-1325.

Japanese examination report for Appl. No. 2009-510545, issued Apr. 25, 2015, 7 pgs. w/ English translation, 9 pgs.

Zachary Loftus et al., "An Overview of Friction Stir Welding TIMETAL 21S Beta Titanium", Paper 1—presented at 5th Int. Symposium on FSW, Metz, France, Sep. 2004, 9 pages.

Ronald E. Jones et al., "Friction Stir Welding of 5 mm Titanium 6AL-4V", Paper 2—presented at 6th Int. Symposium on FSW, Quebec, Canada, Oct. 2006, 12 pages.

M.J. Russell et al., "Recent Developments in Friction Stir Welding of Ti Alloys", Paper 3—presented at 6th Int. Symposium on FSW, Quebec, Canada, Oct. 2006, 10 pages.

M.J. Russell et al., "Recent Developments in the Stationary Shoulder FSW of Titanium Alloys", Paper 4—presented at IIW Annual Assembly, 2007, Dubrovnik, 7 pages.

Notice of Non-Final Rejection, Appl. No. 10-2008-7027830; Issue date: Apr. 22, 2013; 4 pages.

\* cited by examiner

2mm

FRICTION STIR METHOD AND A PAIR OF WORKPIECES JOINED BY SUCH METHOD

The invention relates to friction stir methods for joining or processing low conductivity, high temperature metals and metal alloys.

In this context, we define "high temperature metals and metal alloys" as those with melting temperatures above that of aluminium i.e. above 700° C. We define "low conductivity metals and metal alloys" as those with thermal conductivity less than aluminium, typically less than 250 W/m K, preferably below 150 W/m K, and most preferably below 100 W/m K. High temperature, low conductivity metals and metal alloys have high melting points and high strengths and commonly include ferrous alloys, and materials containing quantities of nickel, cobalt, chromium, molybdenum, tungsten, aluminium, titanium, niobium, tantalum, rhenium and zirconium. Some of these material types can be referred to as superalloys. They also include titanium alloys, which have wide use in high-performance aerospace and other applications.

Low conductivity, high temperature metals and metal alloys have conventionally been joined by fusion methods but it has been recognized that it would be advantageous to join them using friction stir welding (FSW).

Friction stir welding is a method in which a probe of material harder than the workpiece material is caused to enter the joint region and opposed portions of the workpieces on either side of the joint region while causing relative cyclic movement (for example rotational, orbital or reciprocal) between the probe and the workpieces whereby frictional heat is generated to cause the opposed portions to take up a plasticised condition; optionally causing relative movement between the workpieces and the probe in the direction of the joint region; removing the probe; and allowing the plasticised portions to consolidate and join the workpieces together. Examples of friction stir welding are described in EP-A-0615480 and WO 95/26254.

The benefits of friction stir welding have been widely reported in the prior art, especially in comparison to conventional fusion welding techniques. These benefits include no need for consumables or fillers, low distortion in long welds, little preparation, solid phase (no fumes, porosity or splatter, lower heat input, and the avoidance of solidification of a molten weld pool), excellent mechanical properties and forming characteristics of joints.

Friction stir tools can also be used to process a single workpiece. In Friction Stir Processing (FSP), a tool typically used for FSW is moved through the material of a single workpiece to impart a change to the properties of that material instead of being moved along a joint line to create a weld. The thermomechanical reprocessing action of the tool can lead to specific local changes in microstructure, physical properties (plastic behaviour, strength &c.) and chemical properties (corrosion resistance &c.). FSP has also been used to consolidate and repair castings and other structures, helping to remove porosity and improve properties around channels/ports in, for example, cylinder head castings. Examples of FSP can be found in U.S. Pat. No. 6,712,916B, EP-A-1160029, JP 2005-324240A, US 2006-0032891A and U.S. Pat. No. 6,994,916B.

Friction stir tools typically comprise a simple cylindrical or slightly tapered probe or "pin" protruding from a larger diameter flat, domed or tapered shoulder. Typical examples of this type of tool are described in GB-A-2306366. Many modifications of the simple pin tool are known in the prior art. Another common type of tooling known from the prior art is known as the "bobbin tool", as described in EP-A-0615480. This type of tooling overcomes the need for a backing member, often required to react the force created by the action of the tool on the workpiece(s).

Other examples of tools are known, including those with textured surfaces, threaded and fluted pins, those consisting of interchangeable pins and shoulders, and of differing combinations of materials depending upon the application. Examples of these can be found in WO 95/26254, WO 02/092273, U.S. Pat. No. 6,277,430B1, WO 99/52669, EP-A-1361014, U.S. Pat. No. 6,676,004B1 and many others.

Typical workpiece materials commonly joined using friction stir welding are of a low melting temperature and are in this context generally termed as being low temperature metals or materials. The most commonly friction stir weldable of these materials are metals based upon aluminium, magnesium, copper, lead and other similar materials.

Much work has been carried out on joining of high temperature materials by friction stir welding, with varied success. One of the main problems when friction stir welding high temperature materials is selecting the correct tool material, which has conventionally been by use of refractory metals or ceramic materials.

WO 99/52669 considers the use of pure tungsten, tungsten rhenium alloy and tungsten carbide for ferrous materials; and cobalt materials, ceramic or cermet materials for other high temperature applications.

WO 01/85385 relates to the friction stir welding of MMCs, ferrous alloys, non-ferrous alloys, and superalloys using a tool wherein the pin and the shoulder at least include a coating comprised of a superabrasive material. This is typically polycrystalline cubic boron nitride (PCBN).

GB 2402905 describes a tool fabricated from a tungsten-based refractory material, useful for welding of high strength materials like nickel and titanium alloys.

Reasonable weld quality has been achieved in joining of certain Ti grades using W—Re tools of standard geometry, although it is reported that heat imbalances between the weld top and bottom, wormhole defects and problems with flashing, due to high shoulder speeds, and distortion occur with this tooling type. ("An overview of friction stir welding Beta 21S Titanium", Loftus et al, $5^{th}$ FSW Symposium, Metz 2004.) Methods to overcome this, including use of bobbin tooling to balance the heat input, were also proposed in this paper.

US-A-2003/0201307 describes yet another example of a friction stir welding tool in which a probe extends between two shoulders, one of which rotates with the probe while the other rotates independently of the probe. This allows different surface heating rates to be applied by the shoulders which is beneficial when lap welding materials with dissimilar properties that require differing welding parameters.

Various problems are apparent when carrying out friction stir welding and processing of high temperature materials using the tools noted in the prior art, not least degradation of tool materials, generally attributed to the high heat and stresses generated during friction stir welding and processing of these high temperature materials. Problems also occur when controlling the heat input in high temperature materials, not just due to overheating of the tool, but also due to overheating of the workpiece and thermal imbalances throughout the weld profile, as noted in Loftus et al, which can lead to poor joint properties. In certain high temperature materials, this effect is commonly due to the high heat input provided by the relatively large frictional surface of the tool shoulder while imparting enough velocity in the pin to promote material mixing. Although efforts to cool the tool have been successful in prolonging the life of tooling, they only have a limited effect on joint properties. Reducing the diameter of the shoulder portion of the tool can reduce heat input, but also leads to inadequate consolidation of material and generation of large amounts of flash.

In accordance with a first aspect of the present invention, a friction stir method comprises causing a rotating probe of a friction stir tool to enter a workpiece or a joint region between a pair of workpieces, the or each workpiece being a low conductivity, high melting point metal or metal alloy, wherein the probe extends from a single shoulder in contact with the workpiece(s) and rotates relative to the shoulder.

In accordance with a second aspect of the present invention, a friction stir method comprises causing a rotating probe of a friction stir tool to enter a workpiece or a joint region between a pair of workpieces, the or each workpiece being between first and second shoulders in contact with opposite sides of the workpiece(s) and rotates relative to both shoulders.

We have carried out a detailed study of the FSW of high temperature materials, particularly metals, and noted that it is the generation of excessive heat in these high temperature, low conductivity materials which proves to be the most serious problem. The heat generated by the FSW tool tends to remain localized around the weld area which can lead to overheating of the workpiece material.

Even reducing the diameter of the shoulder (to reduce surface heat input) does not overcome the problems of surface overheating. However, with the invention, it is possible to control heat input while maintaining an adequate mixing and consolidation action.

Thus, in the invention, the probe rotates separately from any shoulder. This is because to join low conductivity, high temperature materials it is highly favourable to have no direct interdependency existing between a source of surface heating and a source of internal heating, such as exists when using friction stir welding tools with any fixed probe/shoulder aspect. The complete rotational decoupling of shoulder (or shoulders) and probe allows independent provision of heat input to and through a material. In particular, a sufficient velocity is imparted by the pin to mix material while the shoulder(s) provides sufficient consolidation to the material surface without gross surface overheating.

The separate shoulder(s), which will typically be stationary with respect to the workpiece, but could rotate slowly relative to the probe, adds very little heat (if any) to the weld surface and therefore avoids the problems of surface overheating seen in conventional FSW of high temperature low conductivity, materials. When a single shoulder is provided and with the shoulder in place against the top surface of the workpiece, the rotating FSW tool generally consists of a probe component only, although it is possible to use a stepped probe configuration. This rotating probe generates the heat required for the FSW process, and good quality welds can be produced in high temperature low conductivity, materials.

It is known to provide a friction stir welding tool having a separate probe and shoulder but it has never been recognized that such a tool would be particularly advantageous for use in welding high temperature materials.

For example, JP 2004-358513A describes a friction stir welding tool for joining materials with relatively low crush strength (extrusions) and fine features. This uses a heated tool and an independent shoulder to reduce the geometrical dependence of pin/shoulder and therefore reduce pin size and downforce required when joining difficult geometries. At no time does it seek to address the problems of welding of high-temperature materials by friction stir welding.

U.S. Pat. No. 6,811,632B describes a method and apparatus for joining thermoplastic materials using FSW. The inventive aspect involves the use of a tool comprising of a separate pin and stationary restraining surface. This invention seeks to address the issue of material expulsion of thermoplastic material that would otherwise occur due to the action of a rotating shoulder. This invention is specifically for the joining of thermoplastic materials and at no time suggests that metals would be capable of being joined using an apparatus with similar features. It is suggested by this patent that the methods of friction stirwelding that works for metals does not work for plastics and vice versa. Many reasons are stated for this based on the radically different properties of plastics and metals. This includes the fact that plastics melt during the process while metals do not, that metals require a certain amount of downforce to be imparted to aid consolidation and perpendicular flow of material while plastics do not. It is also keenly pointed out that the introduction of heat through the stationary surface is critical to the success of the process in plastics. This patent is purely aimed at the joining of plastics with no mention of joining metals using this technique. It is specifically mentioned that restraint but not pressure from a restraining member is required. Pressure in the vertical direction influences the material differently and causes problems for plastics. Since the properties inherent to high temperature materials are even further removed from plastics than metals, it would be expected that an opposite approach should be taken.

EP-A-1021270 relates to an apparatus for joining workpieces using FSW. The inventive aspect involves the use of a pin and body (the lowermost part of which is the shoulder, as per a typical FSW tool) that are mutually movable, allowing the pin and body to perform different movement patterns relative to one another. The patent describes the use of a purely stationary body with the necessity of supplying additional heat to the joint region due to the lack of frictional heat produced by the shoulder region. This invention seeks to address the issues of varying thickness in workpieces and supply of additional material during joining. At no time does it seek to address the problems of welding high temperature materials by friction stir welding and no obvious connection can be made between the use of a stationary shoulder and joining high temperature materials. Due to the very properties of high temperature materials, a person skilled in the art would expect to input more heat.

As well as friction stirwelding (FSW), the invention is applicable to other friction stir applications, including friction stir processing, friction stir spot welding, friction stir channeling and any other application using high temperature materials. However; the invention will be described primarily with reference to FSW although it will be readily understood that the preferred features are also applicable to the other applications.

This method can also be used for joining non-planar joint geometries, such as the inner or outer diameter of a pipe, a corner or fillet, or even stepped components. In these cases, the shoulder, for example in the form of a non-rotating slide, could be designed to follow the shape of a component or the shape of the weld to be formed. Furthermore, it can be used for joining more than two workpieces.

To improve the joint quality further, surface coatings or surface treatments could be applied to one or more of the shoulder(s) and the probe. These coatings and treatments could exhibit properties of low friction, wear resistance, temperature resistance, diffusion resistance, and low reactivity and solid state lubrication. Examples of treatments include nitriding, carburizing and nitro-carburizing. Examples of coatings include ceramics such as alumina, zirconia, silicon nitride and sialon; and refractory metals such as molybdenum, cast iron and PCBN.

Inert shielding gas can be applied through the shoulder and around the slide to prevent oxidation and assist with cooling. Examples include argon and helium.

Pre heating could be applied to pre soften the material ahead of the weld.

The shoulder(s) can be cooled (water, gas, heat sink).

Post heating/cooling could be applied to control the thermal cycle experienced by the workpiece material behind the tool.

A twin probe approach could be used to reduce the lateral forces generated and to improve weld quality and tool lifetime. In this case, two rotating probes could be provided extending through respective apertures in a single shoulder, the probes either being in line with the direction of movement of the probe or slightly offset. The probes could have different sizes (length and/or width) and could be contra-rotating.

Multiple probes could be applied for processing of different areas of workpiece material.

During a weld run, the probe component can be gradually retracted to fade-out the weld, or can be extended/retracted to process thicker/thinner sections of the component, while the shoulder(s) remains in contact with the workpieces.

The or each shoulder will normally be a stationary slide but could be made to rotate slowly or crawl round during the joining operation. Typically, the probe will rotate at least 10 times faster than the shoulder(s), the shoulder(s) typically rotating at no more than 50 rpm.

It is preferential to construct the or each shoulder from more than one type of material or more than one piece, and use a high temperature or specially coated insert for containing material near to the rotating probe. For example, a shoulder could be made primarily of a nickel-based alloy but with an insert defined around an aperture through which the probe extends, the insert being made of a ceramic or refractory metal such as those mentioned above.

The probe could be coupled via a solid bearing with the or each shoulder or a small gap could be provided between them.

A twin-shoulder approach can be used, where, as well as providing a shoulder on the top surface, a suitable attachment can be provided for fixing a shoulder underneath the workpiece either by a suitable bearing or pin on the probe or otherwise. Thus, the second shoulder could be stationary or rotate slowly relative to the probe.

The shoulder(s) will normally be subjected to an active applied load in use, typically 500-5000 kg, usually about 3000 kg.

Many different material types and combinations can be joined or processed including:
   Ti and alloys
   Fe, steels and other alloys
   Ni and alloys
   V and alloys
   Cr and alloys
   Mn and alloys
   Co and alloys
   Zr and alloys
   Pd and alloys
   Hf and alloys
   Pt and alloys Dissimilar material combinations can be joined. Due to the very narrow heating and mixing zone provided by the probe alone, the position of the joint region can be such as to preferentially mix and heat one material over another. This can be especially beneficial where joint properties are commonly limited by the formation of intermetallic compounds. The reduced surface heating has the potential to limit intermetallic formation and make possible the joining of many previously unweldable dissimilar material combinations. In fact, many dissimilar materials other than high temperature, low conductivity metals and metal alloys can be joined using the friction stir tools described in this specification.

Apart from facilitating the successful joining of high temperature materials, the aforementioned method also provides advantages when joining in balancing the heat input into joint region. The method can be tailored to give specific joint properties and microstructures. Surface finish of joints made using the slide is generally of a quality far better than that produced using other techniques, both friction-stir and fusion-based.

Other advantages of this approach include:

The ability to produce good quality welds in a stable FSW process in high temperature, low conductivity materials.

Improved welding speed in high temperature, low conductivity, materials compared with conventional FSW (where weld overheating is the limiting factor).

Improved weld root quality compared with conventional FSW, as with the rotating probe only, heat input through the weld is more evenly balanced.

Potential for reduced FSW tool wear and improved tool lifetime due to more balanced distributed of heat in the weld.

The use of a rotating probe as a separate part reduces the volume of high temperature material needed for the FSW tool, which allows advanced/higher quality tool materials to be used, giving improved tool performance.

The use of a non-rotating slide shoulder and lowered surface heat input reduces the possibility of weld contamination, especially when joining materials such as titanium, since the shoulder excludes the external environment from the joint or processed region.

Some examples of methods and apparatus for carrying out methods according to the invention will now be described with reference to the accompanying drawings, in which.

Figure 1:
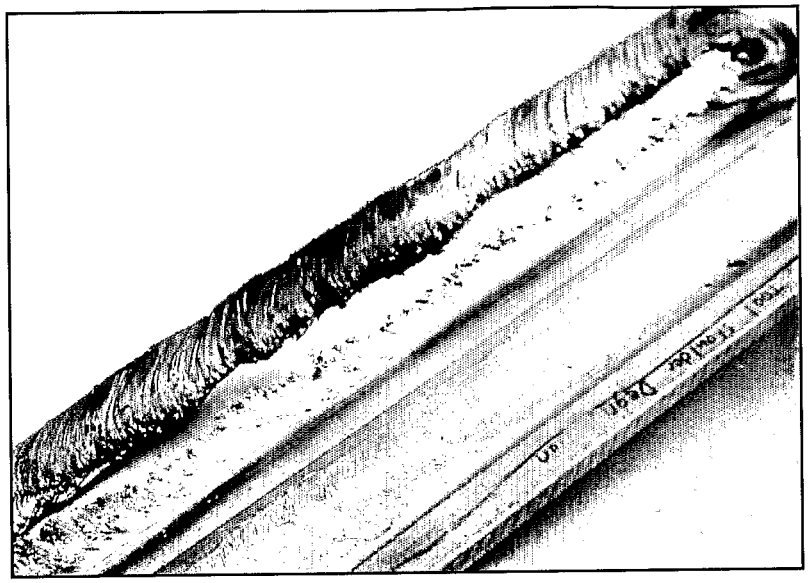
FIGS. 1 and 2 are photographs illustrating the appearance of joints between high temperature materials using a conventional FSW method.
Figure 2:
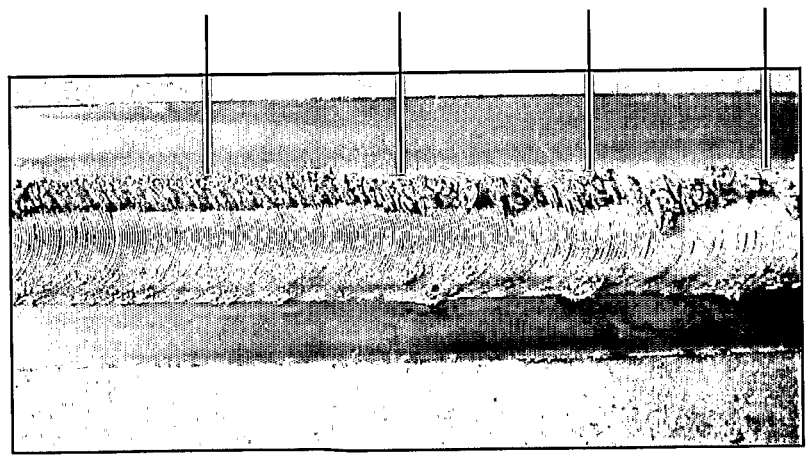

FIGS. 1 and 2 illustrate the problems with using conventional FSW methods for welding high temperature materials, in this case two workpieces of Ti-6Al-4V. As can be seen in both Figures, gross overheating of the joint surface occurs leading to over-softening of the material, inadequate material containment and a poor surface finish. In FIG. 1, a 25 mm diameter shoulder was used with a 15 mm diameter probe, the probe rotating at 200 rpm and translating at 100 mm/min. In FIG. 2 a 15 mm diameter shoulder was used with a 6 mm diameter probe or pin rotating at 250 rpm and translating at between 60 and 90 mm/min.

Figure 3:
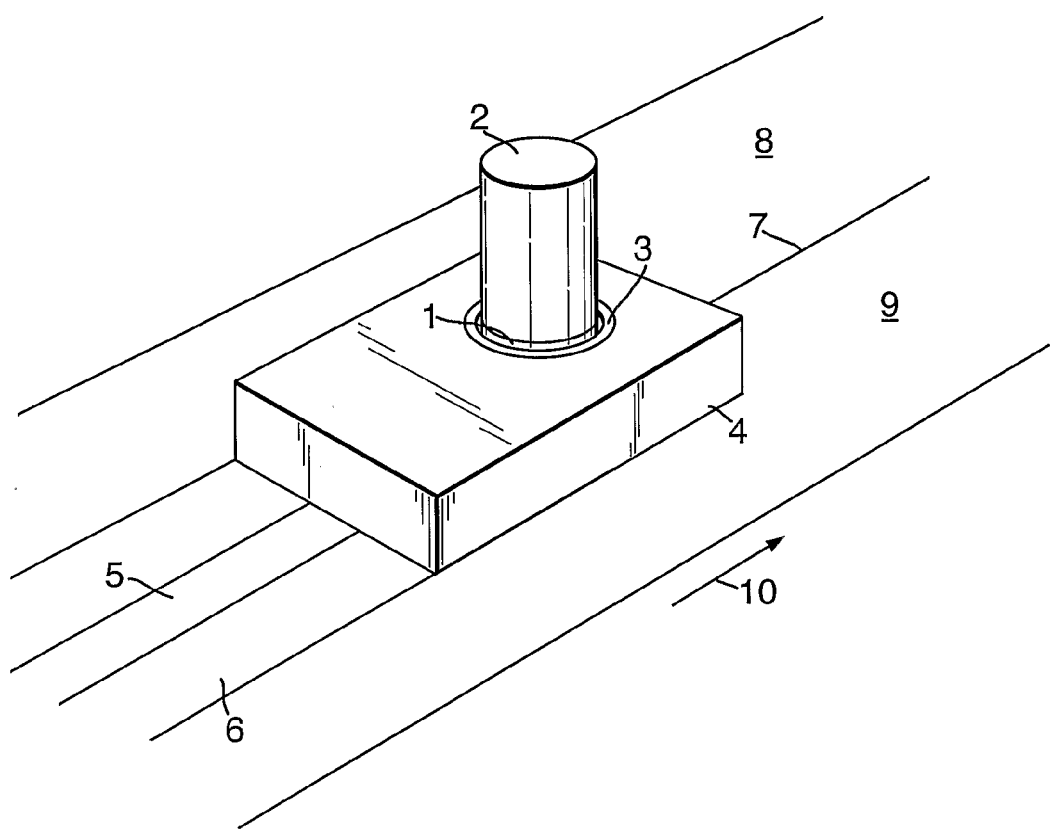
FIG. 3 is a schematic diagram of a first example of a FSW apparatus for carrying out a method according to the invention.

FIG. 3 illustrates an example of a simple apparatus for carrying out a method according to the invention. In this case, an elongate probe 1 extends under applied load from a machine spindle 2 into a joint region 7 between a pair of high temperature metal workpieces 8,9 butted together. The machine spindle is journalled in a main tool head bearing 3 which in turn is supported by a non-rotating slide 4 defining a shoulder component also placed under load. The probe may be made of a refractory alloy such as tungsten or molybdenum or alternatively could be ceramic based being made of alumina, zirconia and the like. The slide 4 is typically made of a nickel-based alloy or other high temperature material and has an insert, as previously described, located near the probe 1.

In use, the machine spindle 2 and hence the probe 1 is rotated at high speed, for example 10-1000 rpm, typically about 500 rpm, and the probe is inserted between the workpieces 8,9. Then the probe and slide 4, which contacts the upper surfaces of the workpieces 8,9 is moved under applied load in the direction of an arrow 10 so as to friction stir weld the workpieces together along a joint region 5. The region traversed by the slide 4, which does not rotate, is illustrated at 6.

Figure 4:
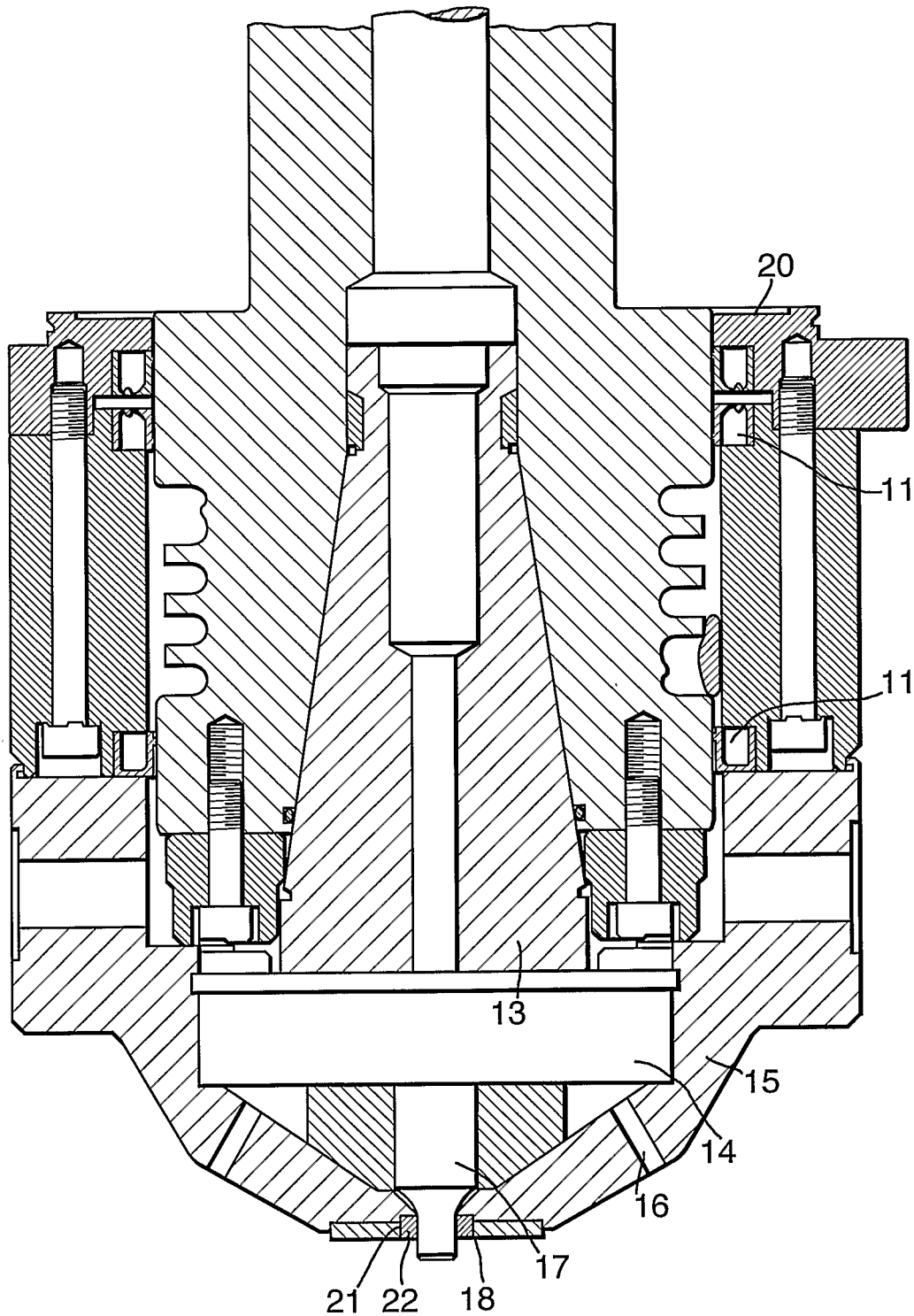
FIG. 4 is a cross-section through a second example of apparatus for carrying out a method according to the present invention.

The apparatus which is shown in principle in FIG. 3 is shown in a more practical embodiment in FIG. 4. FIG. 4 illustrates the FSW tool comprising a main housing 20 which rotatably supports via spindle bearings 11 a machine spindle 13, the upper end of which will be connected to a drive motor for rotatably driving the machine spindle and the lower end of which is supported by a main tool head bearing 14 fixed to the housing 20.

A FSW probe 17 in a holder is connected to the end of the main spindle 13 and protrudes through an opening 21 formed in a lower portion 15 of the housing 20.

The lower portion 15 of the housing 20 supports a non-rotating slide component 18 equivalent to the shoulder of a conventional FSW tool, the slide component having a central, high temperature plug 22 inserted into the opening 21 and defining an aperture through which the probe 17 extends.

Inert shielding gas can be supplied through an inlet hole 12 and exits through outlet holes 16.

Figure 5:
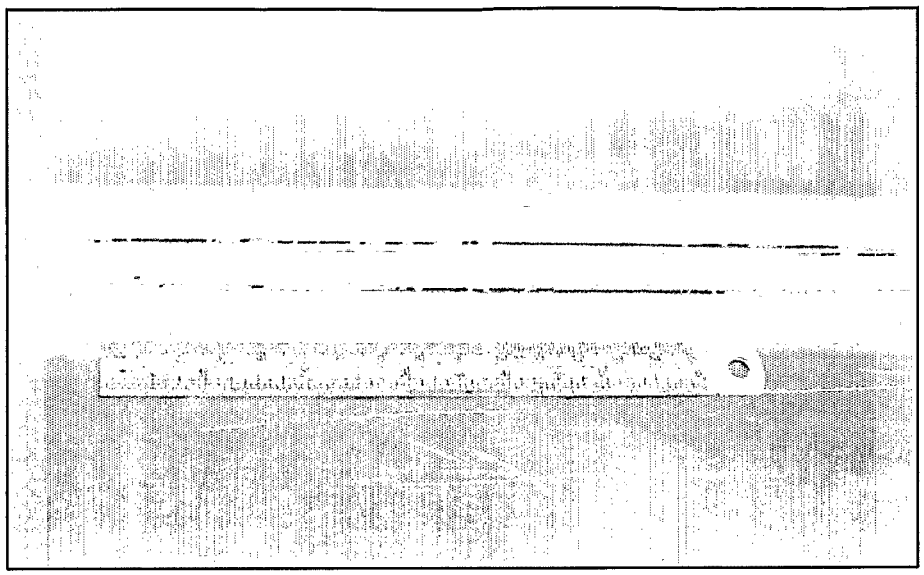
FIG. 5 is a photograph of a butt joint weld formed using a method according to the invention; and, FIG. 6 is a transverse section taken through the weld shown in FIG. 5.
Figure 6:
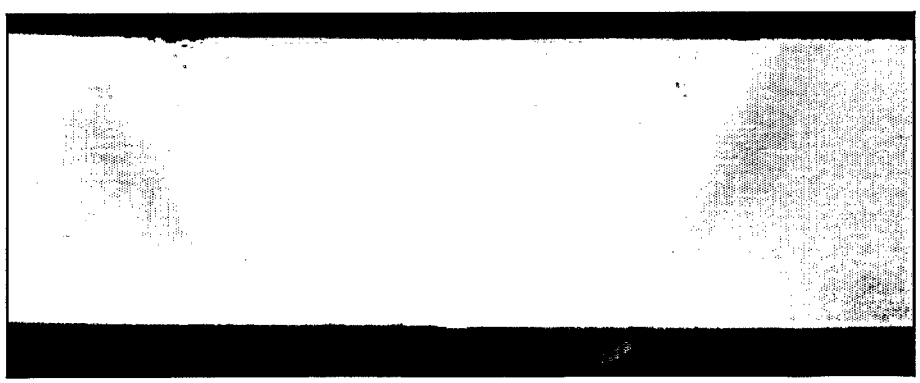

FIG. 5 is a photograph a butt joint weld in Ti-6Al-4V formed using the apparatus shown in FIG. 4. In this case, the probe had an 8 mm diameter, rotated at 300 rpm and translated at 80 mm/min. It should be noted that no post-weld finishing has taken place but it can be seen that a much improved joint has been obtained. The same joint is shown in transverse section in FIG. 6.

The invention claimed is:

1. A method for joining a pair of workpieces, the steps of the method comprising:
  causing a rotating probe of a friction stir welding tool to enter a workpiece or a joint region between a pair of workpieces, each workpiece being a low conductivity, high melting point metal or metal alloy, with a melting temperature above that of aluminum and a thermal conductivity less than that of aluminum, the probe extending from a shoulder and rotating relative to the shoulder, the shoulder constructed of more than one piece, the piece nearer the probe having a high melting point and being an insert defined around an aperture through which the probe extends, the working surface of all the pieces of the shoulder being in contact with the workpieces during joining and not rotating relative to the workpieces, the heat required for joining the workpieces being generated only by the rotating probe.

2. A method according to claim 1, further comprising moving the tool along a joint line between the workpieces.

3. A method according to claim 1, further comprising moving the tool along a line extending along the workpiece.

4. A method according to claim 1, wherein the shoulder defines a slide member.

5. A method according to claim 1, wherein the shoulder is shaped to conform with the surface or surfaces of the workpieces against which it abuts.

6. A method according to claim 1, wherein one or both of the probe and the shoulder is provided with a surface coating or surface treatment affecting one or more of the characteristics, of friction, wear resistance, temperature resistance, diffusion resistance, reactivity, and solid state lubrication.

7. A method according to claim 1, further comprising supplying a shielding gas to the region between the shoulder and the workpieces.

8. A method according to claim 1, further comprising supplying coolant and/or lubricant to the region between the shoulder and the workpieces.

9. A method according to claim 1, wherein each workpiece is selected from the group comprising:
  Ti and all alloys
  Fe, steels and other alloys
  Ni and alloys
  V and alloys
  Cr and alloys
  Mn and alloys
  Co and alloys
  Zr and alloys
  Pd and alloys
  Hf and alloys
  Pt and alloys.

10. A method according to claim 2 or claim 3, wherein the probe is retracted, while rotating, as the tool approaches the end of the line, while the shoulder remains in contact with the workpieces.

11. A method according to claim 1, wherein the melting point of the metal or metal alloy is greater than 700° C.

12. A method according to claim 1, wherein the thermal conductivity of the metal or metal alloy is less than 250 W/mK.

13. A method according to claim 1 wherein the probe extends from a single shoulder in contact with the workpieces.

* * * * *